United States Patent
Lesley et al.

(10) Patent No.: US 6,984,675 B2
(45) Date of Patent: Jan. 10, 2006

(54) FORMALDEHYDE-FREE BINDER COMPOSITIONS FOR SIMULTANEOUS WARP SIZING AND COLORATION OF FILAMENT YARNS

(75) Inventors: David Joe Lesley, Greer, SC (US); Gregory David Lesley, Duncan, SC (US); Darrell Scott Nasser, Easley, SC (US); Kenneth Ray Barton, Spartanburg, SC (US); Eurrell Thomas Eubanks, Lyman, SC (US)

(73) Assignee: Resolution Specialty Materials LLC, Houston, TX (US)

( * ) Notice: Subject to any disclaimer, the term of this patent is extended or adjusted under 35 U.S.C. 154(b) by 257 days.

(21) Appl. No.: 10/101,038

(22) Filed: Mar. 19, 2002

(65) Prior Publication Data

US 2003/0105210 A1 Jun. 5, 2003

Related U.S. Application Data

(60) Provisional application No. 60/333,507, filed on Nov. 28, 2001.

(51) Int. Cl.
*C08L 67/00* (2006.01)
*C08F 2/18* (2006.01)

(52) U.S. Cl. ............ 523/501; 524/845; 525/445; 526/214; 528/295

(58) Field of Classification Search ............ 525/445; 524/845; 526/214; 528/295; 523/501
See application file for complete search history.

(56) References Cited

U.S. PATENT DOCUMENTS

| | | | |
|---|---|---|---|
| 3,734,874 A | 5/1973 | Kibler et al. | |
| 3,779,993 A | 12/1973 | Kibler et al. | |
| 4,233,196 A | 11/1980 | Sublett | |
| 4,300,580 A * | 11/1981 | O'Neill et al. ............ | 132/203 |
| 5,290,631 A | 3/1994 | Fleury et al. | |
| 5,646,237 A | 7/1997 | George et al. | |
| 5,709,940 A | 1/1998 | George et al. | |
| 5,912,281 A | 6/1999 | Clark et al. | |

* cited by examiner

*Primary Examiner*—Tae H. Yoon

(57) ABSTRACT

An aqueous dispersion has an addition polymer (B) formed in situ on a sulfopolyester (A). The sulfopolyester (A) is formed as a polycondensation product of first and second reaction mixtures. The first reaction mixture includes at least about 70 mol. % of terephthalic acid or an ester thereof, and about 4–20 mol. % of a difunctional ester forming sulfomonomer containing at least one metal sulfonate group attached to an aromatic nucleus, wherein the functional groups are selected from the group consisting of hydroxyls, carboxyls and alkyl esters. The second reaction mixture includes at least two different glycols, at least about 20 mol. % of the second reaction mixture being ethylene glycol. The addition polymer (B) is formed in situ on the sulfopolyester (B) by polymerizing styrene monomer.

24 Claims, No Drawings

FORMALDEHYDE-FREE BINDER COMPOSITIONS FOR SIMULTANEOUS WARP SIZING AND COLORATION OF FILAMENT YARNS

CROSS REFERENCE TO RELATED APPLICATIONS

This application is based on and hereby claims priority to Provisional Application No. 60/333,507 filed on Nov. 28, 2001 in the United States Patent and Trademark Office, the contents of which are hereby incorporated by reference.

This application is based on and hereby incorporates by reference the contents of U.S. Pat. No. 5,912,281 and U.S. Pat. No. 5,646,237.

BACKGROUND OF THE INVENTION

This invention provides aqueous dispersions of polystyrene and certain copolymers thereof formed in situ by polymerization of styrene and perhaps other selected monomers in the presence of selected water-dispersible sulfopolyesters. The resulting hybrid polyester/polystyrene dispersions are useful for simultaneously applying warp size and permanent coloration to filament yarns in preparation for weaving without including formaldehyde-releasing resins.

U.S. Pat. No. 5,912,281, assigned to Eastman Chemical Company, discloses similar aqueous dispersions useful in formulating rewettable printing inks. The styrene copolymers of U.S. Pat. No. 5,912,281 contain a minimum of about 7.5 weight % of a hydroxy(alkyl)methacrylate or hydroxy (alkyl)acrylate and a minimum of about 2 weight % of a carboxyl containing monomer. The aqueous dispersion proposed herein must contain ethylene terephthalate repeat units, whereas a broader range of sulfopolyesters and sulfopolyesteramides are said to be useful in U.S. Pat. No. 5,912,281.

It is known that a protective coating called a warp size may be applied to filament polyester yarns in preparation for weaving. Conventionally, this sizing is removed after weaving. Some years ago, it was discovered that a colorant could be applied to polyester yarns in the same operation that the warp size is applied, thus eliminating the need for a separate dyeing or pigmenting process. In this case, the sizing is not removed after weaving. This combined operation is often referred to as "slasher dyeing" or "slasher pigmenting." It is particularly suitable for mattress ticking, drapery lining and other items that are not usually put into a washing machine. However, in order to obtain colorfastness on slasher-colored goods, i.e., to prevent bleeding or rub-off of the color in product use, it has been necessary to include formaldehyde in the sizing formula, along with a sulfopolyester, to secure the dye or pigment to the yarn. This practice has the unfortunate side effect of possibly releasing formaldehyde, a suspected human carcinogen, into the workplace atmosphere, into product showrooms and, ultimately, into the consumer's home.

SUMMARY OF THE INVENTION

One object of the present invention is to eliminate the need for formaldehyde resins in the slasher-coloration operation, thereby eliminating a potential human health hazard and simplifying the manufacturing process.

Applicants have discovered that certain hybrid polyester/polystyrene emulsions can be used successfully as a combination warp size and color-binder without the requirement of formaldehyde resins.

Specifically, applicants propose an aqueous dispersion having an addition polymer (B) formed in situ on a sulfopolyester (A). The sulfopolyester (A) is formed as a polycondensation product of first and second reaction mixtures.

The first reaction mixture includes at least about 70 mol. % of terephthalic acid or an ester thereof, and about 4–20 mol. % of a difunctional ester forming sulfomonomer containing at least one metal sulfonate group attached to an aromatic nucleus, wherein the functional groups are selected from the group consisting of hydroxyls, carboxyls and alkyl esters. 5-sodiosulfoisophthalic acid or an ester thereof is one example of a suitable difunctional ester forming sulfomonomer. The first reaction mixture may also contain from about 0.1 mol. % to about 5 mol. % of a saturated aliphatic or a saturated alicyclic dicarboxylic acid, or ester thereof. The first reaction mixture may contain from about 85 to about 90 mol. % terephthalic acid and from about 10 to about 15 mol. % of the difunctional ester forming sulfomonomer. All components of the first reaction mixture sum to 100 mol. %.

The second reaction mixture includes at least two different glycols, at least about 20 mol. % of the second reaction mixture being ethylene glycol. More particularly, the second reaction mixture may contain at least about 25 mol. % ethylene glycol and still more particularly, the second reaction mixture may contain from about 40 mol. % to about 60 mol. % ethylene glycol. The second reaction mixture may include ethylene glycol, diethylene glycol and triethylene glycol. The second reaction mixture may contain from about 0.1 mol. % to about 5 mol. % of a poly (ethylene glycol) and/or from about 0.1 mol. % to about 5 mol. % of a poly (tetramethylene glycol). All components of the second reaction mixture sum to 100 mol. %.

The addition polymer (B) is formed in situ on the sulfopolyester (B) by polymerizing styrene monomer. The addition polymer (B) may be from polymerizing a plurality of monomers, the plurality of monomers including at least about 40 weight % styrene monomer. More particularly, the plurality of monomers include at least about 50 weight % styrene monomer. The plurality of monomers includes styrene monomer and at least one carboxylic acid or ester thereof. With regard to suitable carboxylic acids, the addition polymer (B) may be formed from polymerizing about 0.1 weight % to about 15 weight % of acrylic acid, methacrylic acid, itaconic acid, maleic acid, fumaric acid or a mixture thereof. As to suitable esters, the addition polymer (B) may be formed from polymerizing from about 0.1 weight % to about 60 weight % (more particularly 50 weight %) of an ester of acrylic acid, methacrylic acid, itaconic acid, fumaric acid, maleic acid or a mixture thereof.

The aqueous dispersion may contain substantially no hydroxyethyl acrylate or formaldehyde.

The aqueous dispersion may have a total polymer content (A+B) of about 60 weight % or less and more particularly a total polymer content (A+B) of about 50 weight % or less.

The aqueous dispersion may contain from about 40 weight % to about 95 weight % of the sulfopolyester (A) and from about 60 weight % to about 5 weight % of the addition polymer (B). More particularly, the aqueous dispersion may contain from about 60 weight % to about 80 weight % of the sulfopolyester (A) and from about 40 weight % to about 20 weight % of the addition polymer (B). Weight percentages are based on total polymer content (A+B).

The sulfopolyester (A) may have an inherent viscosity of at least about 0.20 dL/g measured at 25° C. in 60/40 parts by weight of a phenol/tetrachloroethane solvent at a concentration of 0.25 g/dL.

One example of a suitable aqueous dispersion is formed from 5-sodosulfoisophthalic acid (or the dimethyl ester thereof) as the difunctional ester forming sulfomonomer. This example has a mol. ratio of terephthalic acid to 5-sodiosulfoisophthalic acid of approximately 85/15. The addition polymer (B) is derived solely from styrene monomer, and the weight ratio of sulfopolyester (A) to addition polymer (B) is approximately 70/30.

Another example of a suitable aqueous dispersion is formed using a mol. ratio of terephthalic acid to 5-sodiosulfoisophthalic acid of approximately 87/13. Of course, corresponding esters would have the same mol. ratio. According to this example, the addition polymer (B) is formed from polymerizing styrene monomer and itaconic acid. The weight ratio of styrene monomer to itaconic acid is approximately 99.5/0.5, and the weight ratio of sulfopolyester (A) to addition polymer (B) is approximately 68/32.

To color and size a yarn, such as polyester, the aqueous dispersion is formed. Then the aqueous dispersion is diluted with water and colorant is added. After diluting with water and adding colorant, the aqueous dispersion is coated on the yarn, after which the yarn is dried.

A coloration and sizing mixture may be made from the aqueous dispersion and colorant. The coloration and sizing mixture may include one or more auxiliaries, such as an antimigrant, a defoamer, an antistat, a lubricant, a dispersant and a biocide.

DETAILED DESCRIPTION OF THE EMBODIMENTS

According to one embodiment, aqueous polymerization of styrene monomer (and, optionally, other comonomers) takes place in the presence of selected water-dispersible sulfopolyesters as defined herein. Thus, the polymerization occurs in situ. The resulting aqueous emulsions are diluted with water to sizing level (commonly, 5–10% solids), combined with colorants and auxiliaries, such as antimigrants antistats and lubricants, and applied to polyester filament yarns on a slasher to produce pre-colored yarns ready for weaving. Woven fabrics made in this way may be converted into a variety consumer products, such as draperies, furniture coverings and mattress tickings.

The addition polymers (B) is formed in situ by polymerization (in the presence of a dispersion a sulfopolyester described above) of a styrene monomer. The styrene monomer may be used by itself or with other monomers. For example, a carboxylic acid or an ester of a carboxylic acid, or both may be used with the styrene monomer. When the styrene monomer is not used by itself, the composition is as follows:

(a) at least about 50 weight % styrene monomer or derivatives thereof;

(b) up to about 15 weight % of a carboxyl containing monomers, selected from acrylic acid, methacrylic acid, itaconic acid, maleic acid, fumaric acid and mixtures thereof;

(c) up to about 50 weight % of esters of acrylic, fumaric acid, itaconic acid, methacrylic acid and mixtures thereof, where (a)+(b)+(c)=100 weight %.

The aqueous dispersions may contain about 40–95% by weight of sulfopolyester (A) and about 60–5% by weight additional polymer (B), based on the total weight of the polymers (A+B). More particularly, the aqueous dispersion may contain about 60–80% by weight of sulfopolyester (A) and about 40–20% by weight additional polymer (B). Total polymer content (A+B) of the aqueous dispersions can be as high as about 60% by weight, the remainder being water or other volatile components, such as ammonia. Typically, the aqueous dispersions are prepared at a total polymer (A+B) content of about 30% by weight. At this concentration, the dispersion may be sold and shipped to a textile manufacturer. There, it can be diluted by the user to about 5%–10% by weight polymer (A+B) for compounding with colorants and auxiliaries.

Procedures for preparing sulfopolyesters are given in numerous U.S. patents (U.S. Pat. Nos. 3,734,874; 3,779,993; 4,233,196; 5,290,631 and 5,709,940, among others). A typical synthesis procedure is given in Example 1 of U.S. Pat. No. 5,646,237. This example illustrates sulfopolyester preparation from the dimethyl esters of terephthalic acid and 5-sodiosulfoisophthalic acid. With minor variations, this method can be adapted to prepare a sulfopolyester from terephthalic acid and 5-sodiosulfoisophthalic acid. A preferred sulfopolyester composition is prepared in the manner described in Example 3 of U.S. Pat. No. 5,646,237, wherein the final sulfopolyester composition has an 89/11 mol. ratio of terephthalic acid/5-sodiosulfoisophthalic acid ("5-SSIPA") residues and a 56/43/1 mol. ratio of ethylene glycol/diethylene glycol/PTMG 1000 residues. It should be noted that the term "residues" refers to polymer units remaining from the respective monomer(s). Thus, an 89/11 mol. ratio of terephthalic acid residue/5-SSIPA residue indicates the same mol. ratio in the monomers used to produce the polymer.

Suitable sulfopolyesters are those that contain ethylene terephthalate repeat units; specifically, sulfopolyesters containing at least about 70 mol. % terephthalic acid residues and at least about 20 mol. % ethylene glycol residues (dicarboxylic acid residues and glycol residues sum to 200 mol. %). Sulfopolyesters outside of this compositional range do not provide adequate color fastness on the finished textile goods unless formaldehyde crosslinking resins are included in the size bath mixture, thereby defeating a principal object of this invention.

Other than terephthalic acid, dicarboxylic acids that can be used in minor amounts in making suitable sulfopolyesters include isophthalic acid; 2,7-naphthalenedicarboxylic acid; 1,4-cyclohexanedicarboxylic acid and aliphatic dicarboxylic acids, such as adipic acid, glutaric acid, succinic acid, azelaic acid and sebacic acid. It should be understood that the use of the corresponding anhydrides, esters and acid chlorides is included in the term "dicarboxylic acid."

Component (b) of the first reaction mixture is at least one difunctional ester forming sulfomonomer containing at least one metal sulfonate group attached to an aromatic nucleus wherein the functional groups are hydroxy or carboxyl, the sulfomonomer being present in an amount from about 4 to about 25 mol. %, based on a total of all acid and hydroxyl equivalents being equal to 200 mol. %.

The difunctional ester forming sulfomonomer component of the polyester may advantageously be a dicarboxylic acid or an ester thereof containing a metal sulfonate group, a glycol containing a metal sulfonate group or a hydroxy acid containing a metal sulfonate group or a hydroxy acid containing a metal sulfonate group. The metal ion of the sulfonate salt may be Na+, Li+, K+ and the like.

Advantageous difunctional ester forming sulfomonomer components are those wherein the sulfonate salt group is attached to an aromatic acid nucleus such as benzene, naphthalene, diphenyl, oxyphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters.

Particularly superior results are achieved when the difunctional ester forming sulfomonomer component is 5-sodiosulfoisophthalic acid or its esters, and the glycol is a mixture of ethylene glycol and diethylene glycol.

Preferred glycols, in addition to ethylene glycol, include diethylene glycol, triethylene glycol, polyethylene glycols, and polyalkylene glycols. Suitable glycols include cycloaliphatic glycols preferably having 6 to 20 carbon atoms and aliphatic glycols preferably having 3 to 20 carbon atoms. Specific examples of such glycols are ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, diethanol, 2,2,4-trimethyl-1,6-hexanediol thiodiethanol, 1,2-cyclohexanedimethanol, 1,3-cyclohexanedimethanol, 1,4-cyclohexanedimethanol, 2,2,4,4-tetramethyl-1,3-cyclobutanediol, and p-xylylenediol. Mixtures of glycols may also be used.

A preferred glycol combination is ethylene glycol, diethylene glycol, and polytetramethylene glycol 1000 as described in U.S. Pat. No. 5,646,237, Example 1. Inclusion of polytetramethylene glycol 1000 aids in polymer film flexibility but is not critical. It has been found experimentally that sulfopolyesters prepared from ethylene glycol or mixtures of ethylene glycol and diethylene glycol will usually contain a few mol. % of triethylene glycol residues and perhaps higher polyethylene glycol residues as well. These residues are preferably maintained at less than 10 mol. % by including a buffer, such as sodium acetate, in the polymerization mix as described in previously cited art.

Suitable addition polymers (B) are formed in water dispersions of the sulfopolyesters (A) by radical-initiated emulsion or suspension polymerization methods. For example, the monomers of polymer (B) are generally added to an aqueous dispersion of the water-dispersible sulfopolyester (A) and polymerized by free radical initiation using conventional emulsion or suspension polymerization processes.

The polymerization can be initiated by a water-soluble or water-dispersible free radical initiator known in the art such as sodium persulfate, or by an oil-soluble initiator such as benzoyl peroxide. Other useful initiators include initiators such as ammonium persulfate, sodium metabisulfite, and redox initiators such as sodium formaldehyde sulfoxylate/Fe/hydrogen peroxide. The concentration of the initiator will generally range from about 0.01% to about 0.5% based on total reaction weight.

Although a surfactant is not necessary for stabilization of the aqueous dispersion of the present invention, the use of a surfactant or a combination of surfactants is not excluded. A list of surfactants, including suggested applications, is available in the treatise: McCutcheon's Emulsifiers & Detergents, North American Edition and International Edition, MC Publishing Co., Glen Rock, N.J., 1993. The sulfopolyesters of this invention serve as satisfactory stabilization agents for preparation of suitable addition polymers of this invention. A surfactant may be detrimental to color fastness.

Typical Polymerization Procedure for Producing Aqueous Polymer Dispersions of this Invention Step 1—Prepare a sulfopolyester of composition described above and disperse in water at 30% solids.

Step 2—Charge the sulfopolyester dispersion to a conventional resin kettle together with a styrene monomer (and, optionally other comonomers). The styrene monomer(s) is the polymerized by free radical initiation (thermal or redox) using conventional emulsion polymer techniques, such as forming pre-emulsions, "kicking" with radical initiators and "chasing" with hydroperoxides to remove residual unreacted monomers. A typical redox procedure follows.

A 3-liter resin kettle was equipped with a stirrer, a temperature-controlled heating mantle, a water-cooled reflux condenser, a nitrogen purge and ports for addition of monomers, initiators and other ingredients as described below. The kettle was charged with 1367 grams of a 30% aqueous dispersion of the sulfopolyester described in Example 3 of U.S. Pat. No. 5,646,237, and 132.8 grams of water. With the stirrer operating, a solution of 0.8 grams of ABEX EP-120 (30% active ammonium nonoxynol-30 sulfate solution supplied by Rhodia North American Chemicals) in 9.1 mL of water was added to the kettle. In a separate container 13.5 mL water, 5.0 grams of 0.1% ferrous sulfate solution, 1.6 grams of Worthene 120 (a solution of ethylenediamine tertraacetic acid, disodium salt, for chelating hard water cations) and 0.4 grams of itaconic acid were mixed. This solution was then added to the reaction kettle and mixed thoroughly. The reaction kettle was closed, blanketed under a nitrogen atmosphere and heated to 150° F. (65° C.). Eighty-two grams of styrene monomer in an addition funnel were added to the kettle and the kettle contents were mixed for 15 minutes. The monomer funnel was flushed (to the kettle) with 9.1 mL of water.

In two separate containers, two "kick" solutions were prepared as follows: (1) 9.2 grams of water and 0.8 grams of tertiary-butyl hydroperoxide; (2) 9.2 grams of water and 0.4 grams of erythrobic acid. When the kettle temperature reached 150° F. (65° C.), kick solution (1) was added to the kettle and flushed with 4.6 grams of water. Then, kick solution (2) was added to the kettle and flushed with 4.6 grams of water. An exotherm in temperature increase of 10° F. to 20° F. (5.5° C. to 11° C.) occurred within 15 minutes. The kettle temperature was held at the maximum exotherm temperature for 30 minutes, then raised to 190° F. (88° C.) (if necessary) and held for an additional 60 minutes. After the 60 minute hold, the kettle was cooled to 150° F. (65° C.). A second charge of 0.4 grams of itaconic acid and 82 grams of styrene monomer (flushed with a total of 3.2 grams of water) were added to the kettle, and the kettle contents were mixed for 15 minutes.

In separate mixing vessels, kick solutions (1) and (2) as described above were prepared again and added to the kettle, which was at 150° F. (65° C.), in sequence. Each was flushed with 4.6 grams of water. A second exotherm of 10° F.–20° F. (5.5° C. to 11° C.) occurred within about 15 minutes. The kettle was held at the maximum exotherm temperature for 30 minutes, then at 190° F. (88° C.) for 60 minutes and then cooled to 165° F. (74° C.). Two "chaser" solutions, a first formed of 0.4 grams of tertiary-butyl hydroperoxide in 27.5 grams of water; and a second formed of 0.2 grams of erythrobic acid in 27.5 grams of water, were added to the kettle simultaneously over a period of 30 minutes to force polymerization of any unreacted styrene monomer remaining at this point. The kettle was cooled to 120° F. (59° C.) and held at this temperature for 60 minutes while being purged with a nitrogen sparge below the surface of the liquid. At this point, additional auxiliaries, such as biocides and/or defoamers were added. The polyester—polystyrene hybrid emulsion was then filtered through a 50 micron canister bag. Other such filter medium could be used as well. The total weight of all ingredients is about 2000 grams; % nonvolatile is 30%; pH is 5; viscosity is 100 cP, residual styrene monomer is less than 100 ppm and appearance is opaque brownish hydrosol. The dispersion is now ready to be formulated with pigments and other auxiliaries for use as a formaldehyde-free binder for slasher coloration.

Typical Procedure for Preparing a Slasher Coloration Mix Utilizing an Aqueous Polymer Dispersion of this Invention (120-Gallon Scale)

Into a mixing vessel equipped with a high-speed agitator, are added the following ingredients in the order shown:

New Technology

| Ingredient | Amount | Function | Source |
|---|---|---|---|
| Water | 60 gallons | Medium | |
| Pigment Yellow 3 | 193 grams | Colorant | Sun Chemical Co. |
| Scarlet NGYR | 13896 grams | Colorant | Astro American Co. |
| Pigment Blue 15:3 | 9604 grams | Colorant | Colortex Corp. |
| Acrylsol G-111 | 48 pounds | Antimigrant | Rohm & Haas |
| Colloids 999 | 1092 grams | Defoamer | Rhodia |
| Polyester-Polystyrene Hybrid | 53 pounds | Size - Binder | Example above |
| Texstat 1 | 4.8 pounds | Antistat | Abco Industries |
| WO-1 Oil | 1.2 pounds | Lubricant | Abco Industries |
| Progasol LF-330 | 0.6 pounds | Dispersant | Abco Industries |
| Water | Up to 120 gal. | Medium | |

Typical Procedure for Preparing a Slasher Coloration Mix Utilizing Conventional Formaldehyde Resin Technology Prior Art Technology

| Ingredient | Amount | Function | Source |
|---|---|---|---|
| Water | 60 gallons | Medium | |
| Pigment Yellow 3 | 193 grams | Colorant | Sun Chemical Co. |
| Scarlet NGYR | 13896 grams | Colorant | Astro American Co. |
| Pigment Blue 15:3 | 9604 grams | Colorant | Colortex Corp. |
| Ammonium Nitrate-30% solution | 3600 grams | Catalyst | Tera International, Inc. |
| Acrylsol G-111 | 48 pounds | Antimigrant | Rohm & Haas |
| Colloids 999 | 1092 grams | Defoamer | Rhodia |
| Eastman WD-30 | 53 pounds | Size - Binder | Abco Industries |
| Aerotex 3730 | 9.6 pounds | Crosslinking Resin | Cytec |
| Texstat 1 | 4.8 pounds | Antistat | Abco Industries |
| WO-1 Oil | 1.2 pounds | Lubricant | Abco Industries |
| Progasol LF-330 | 0.6 pounds | Dispersant | Abco Industries |
| Water | Up to 120 gal. | Medium | |

In the above table, Eastman WD-30 is a sulfopolyester similar to Polymer D disclosed in Example 2, U.S. Pat. No. 3,734,874. Because Eastman WD-30 is not a polyester hydrid of the kind disclosed in this invention, a formaldehyde resin, such as Aerotex 3730, is required to crosslink the polyester binder and thereby impart permanent colorfastness.

The slasher-coloration mix is transferred to the size box of a conventional filament slasher, equipped with a predrier and heated cans, and applied to polyester warps. Sized and colored warps are woven on conventional looms (air jet looms, typically) to produce cloth for draperies, furniture, mattress ticking and other textile end uses.

Description of Test Methodology

Colorfastness to Wet and Dry Crocking (AATCC Test Method 8-1996)

The tendency of color to rub off of a textile article onto a white test cloth is measured by AATCC Test Method 8-1996 and expressed as Grade 1 through Grade 5 on the Chromatic Transference Scale or the Gray Scale for Staining. Grade 5 indicates negligible or no color transfer; Grade 1 is color transfer equivalent to Row 1 on the Chromatic Transference Scale or Step 1 on the Gray Scale for Staining and indicates a high level of color rub-off. Intermediate grades indicate intermediate levels of color transfer. Color rub-off is undesirable.

Colorfastness to Perspiration (AATCC Test Method 15-1997)

A specimen of the colored fabric is placed in contact with other fiber materials (multifiber test fabric) and wet out with simulated acid perspiration solution or water, subjected to a fixed mechanical pressure and allowed to dry slowly at an elevated temperature. After conditioning, the specimen is evaluated for color change and the other fiber materials are evaluated for color change by the Chromatic Transference Scale or the Gray Scale for Staining as described above. Color bleed or transfer is undesirable.

The above test methods are published by the American Association of Textile Chemists and Colorist in Volume 75 of the AATCC Technical Manual (Library of Congress Catalogue Number 54-34349).

EXAMPLES

| Example No. | Sulfopolyester (A) | Parts (A) | Addition Polymer (B) | Parts (B) |
|---|---|---|---|---|
| 1 | Example 2, Polymer D, U.S. Pat. No. 3,734,874 | 100 | None (Control I) | 0 |
| 2 | Example 2, Polymer D, U.S. Pat. No. 3,734,874 | 70 | 99.5/0.5 Styrene/Itaconic Acid (described above) (Control II) | 30 |
| 3 | Example 1, U.S. Pat. No. 5,646,237 | 100 | None | 0 |
| 4 | Example 1, U.S. Pat. No. 5,646,237 | 70 | 99.5/0.5 Styrene/Itaconic Acid (described above) | 30 |
| 5 | Example 2, U.S. Pat. No. 5,290,631 | 70 | 99.5/0.5 Styrene/Itaconic Acid (described above) | 30 |

-continued

| Example No. | Sulfopolyester (A) | Parts (A) | Addition Polymer (B) | Parts (B) |
|---|---|---|---|---|
| 6 | Polyester of Example 1, U.S. Pat. No. 5,646,237 except no PTMG glycol | 70 | 99.5/0.5 Styrene/Itaconic Acid (described above) | 30 |
| 7 | Polyester No. 2 of Table IV, U.S. Pat. No. 3,734,874 | 70 | 99.5/0.5 Styrene/Itaconic Acid (described above) | 30 |
| 8 | Example 1, U.S. Pat. No. 5,646,237 | 70 | 100% polystyrene | 30 |
| 9 | Example 1, U.S. Pat. No. 5,646,237 | 70 | 85/15 styrene/acrylic acid | 30 |
| 10 | Example 1, U.S. Pat. No. 5,646,237 | 70 | 85/10/5 styrene/acrylic acid/ethyl acrylate | 30 |
| 11 | 87/13 terephthalic acid/5-SSIPA with 100 mol. % DEG | 70 | 99.5/0.5 styrene/itaconic acid | 30 |
| 12 | 87/13 terephthalic acid/5-SSIPA with 74/26 DEG/EG | 70 | 99.5/0.5 styrene/itaconic acid | 30 |
| 13 | Same as Ex. 12 except 0.8 mol. % PTMG 1000 | 70 | 99.5/0.5 styrene/itaconic acid | 30 |
| 14 | Example 1, U.S. Pat. No. 5,646,237 | 70 | 75/25 styrene/butyl acrylate | 30 |
| 15 | Same as Ex. 3 | 50 | 90/10 styrene/methacrylic acid | 50 |
| 16 | Same as Ex. 3 | 95 | 50/50 styrene/butyl acrylate | 5 |
| 17 | Same as Ex 3 | 70 | 50/25/20/5 styrene/butyl acrylate/methyl methacrylate/methacrylic acid | 30 |
| 18 | Same as Ex. 3 | 40 | 90.5/20/0.5 styrene/butyl acrylate/itaconic acid | 60 |

In Examples 1–18, polyester compositions are expressed as mol. ratios of dicarboxylic acids and glycols, each summing to 100 mol. %. Addition polymer compositions are expressed as weight ratios of monomers. Parts of sulfopolyesters (A) and addition polymers (B) are expressed as weight % of total solids in the polyester hybrid. PTMG 1000 is poly(tetramethylene glycol), average molecular weight 1000. 5-SSIPA is 5-sodiosulfoisophthalic acid or an ester thereof.

Example 1 illustrates a sulfopolyester with no terephthalic acid or ethylene glycols residues (outside scope of this invention) and no addition polymer (Control I).

Example 2 illustrates the same sulfopolyester as Example 1 (outside scope) but hybridized with a high-styrene addition polymer (within scope) (Control II).

Example 3 illustrates a sulfopolyester with a high ethylene terephthalate content (within scope) but without addition polymer hybridization (outside scope).

Example 4 illustrates the same sulfopolyester as Example 3 but with a high-styrene addition polymer (a full illustration of this invention).

Example 5 illustrates a sulfopolyester containing isophthalic acid as well as terephthalic acid, hybridized with a high-styrene addition polymer. In this Example, terephthalic acid is present at approximately 73 mol. % of the first reaction mixture (just inside the scope of this invention).

Example 6 illustrates another sulfopolyester with a high ethylene terephthalate content and a high-styrene addition polymer as in Example 4, showing that incorporating PTMG glycol into the sulfopolyester is not necessary for this invention.

Example 7 illustrates sulfopolyester high in terephthalic acid content but having no ethylene glycol residues (only diethylene glycol residues)(outside scope).

Example 8 illustrates a sulfopolyester of this invention hybridized with a 100% styrene addition polymer, showing that copolymerization of styrene with other monomers is not necessary.

Example 9 illustrates a sulfopolyester of this invention hybridized with a styrene/acrylic acid copolymer (within scope).

Example 10 illustrates a sulfopolyester of this invention hybridized with a styrene terpolymer (within scope).

Examples 11 illustrates a sulfopolyester of high terephthalic acid content but with no ethylene glycol (outside scope of this invention).

Example 12 illustrates a sulfopolyester of this invention, similar to the polyester of Example 11 except that it contains a sufficient amount of ethylene glycol, i.e., a minimum of about 25 mol. %, to produce acceptable crock and colorfastness (within scope).

Example 13 illustrates a sulfopolyester identical to the polyester of Example 11 except that it contains a low level of copolymerized PTMG 1000 glycol (as taught in U.S. Pat. No. 5,646,237) which improves polymer flexibility (within scope).

Example 14 illustrates a useful hybrid composition containing styrene and an ester of methacrylic acid in the addition polymer (within scope).

Example 15 illustrates a useful hybrid composition containing styrene and methacrylic acid in the addition polymer and only 50 weight % sulfopolyester (within scope).

Example 16 illustrates a useful hybrid containing only 5 weight % addition polymer (within scope).

Example 17 illustrates a useful hybrid in which the addition polymer contains all three types of monomers useful in this invention (within scope).

Example 18 illustrates a useful hybrid containing only 40 weight % polyester (within scope).

The above Examples are used in slasher coloration mixes to size and color 150 denier/30 filament polyester warps and woven into cloth. Colorfastness of each cloth is determined by the AATCC Test Methods cited above. The sulfopolyester of Example 1 is also used in the same manner in a slasher color mix (prior art technology) for comparison with the new technology (Example 19).

| Example No. | Hybrid Example No. | Color Mix Technology | AATCC Test Method 8-1996 Crockfastness Dry | AATCC Test Method 8-1996 Crockfastness Wet | AATCC Test Method 15-1997 Color Fastness | Formaldehyde? |
|---|---|---|---|---|---|---|
| 19 | 1 | Prior Art | 4 | 4 | 4 | yes |
| 20 | 1 | New | 1 | 1 | 1 | no |
| 21 | 2 | New | 2 | 2 | 2 | no |
| 22 | 3 | New | 2 | 2 | 2 | no |
| 23 | 4 | New | 4.5 | 4.5 | 4.5 | no |
| 24 | 5 | New | 3 | 3 | 3 | no |
| 25 | 6 | New | 4.5 | 4.5 | 4.5 | no |
| 26 | 7 | New | 2 | 2 | 2 | no |
| 27 | 8 | New | 4.5 | 4.5 | 4.5 | no |
| 28 | 9 | New | 4 | 4 | 4 | no |
| 29 | 10 | New | 4 | 4 | 4 | no |
| 30 | 11 | New | 3 | 3 | 2.5 | no |
| 31 | 12 | New | 4 | 4 | 4 | no |
| 33 | 13 | New | 4 | 4 | 4.5 | no |
| 34 | 14 | New | 4 | 3.5 | 5 | no |
| 35 | 15 | New | 4 | 3.5 | 5 | no |
| 36 | 16 | New | 4 | 3.5 | 4 | no |
| 37 | 17 | New | 4 | 5 | 4 | no |
| 38 | 18 | New | 4 | 3.5 | 5 | no |

Examples 23, 25, 27, 28, 29 and 31–38 illustrate the present invention in that both the sulfopolyester and the hybrid addition polymer meet the compositional requirements and a formaldehyde-containing resin is not required to obtain acceptable crock and colorfastness. Example 19 relates more to the prior art technology. Crock and colorfastness ratings for the prior art technology are acceptable but a formaldehyde-containing crosslinking resin is required (Control I). Examples 20 (Control II), 21, 22, 24, 26 and 30 illustrate the inferior results obtained with compositions outside the scope of this invention.

The present invention has been described in detail with reference to the embodiments thereof, but it will be understood by those skilled in the art that variation and modifications can be made within the scope of the invention as described above.

What is claimed is:

1. An aqueous dispersion, comprising:
  (A) a sulfopolyester formed as a polycondensation product of:
    (1) a first reaction mixture comprising:
      (a) at least about 70 mol. % of terephthalic acid or an ester thereof, and
      (b) about 4–20 mol. % of a difunctional ester forming sulfomonomer containing at least one metal sulfonate group attached to an aromatic nucleus, and functional groups selected from the group consisting of hydroxyls, carboxyls and alkyl esters; and
    (2) a second reaction mixture comprising ethylene glycol, diethylene glycol and triethylene glycol, at least about 20 mol. % of the second reaction mixture being ethylene glycol; and
  (B) an addition polymer formed in situ on the sulfopolyester from polymerizing styrene monomer.

2. An aqueous dispersion according to claim 1, wherein the aqueous dispersion contains substantially no hydroxyethyl acrylate.

3. An aqueous dispersion according to claim 1, wherein the aqueous dispersion contains substantially no formaldehyde.

4. An aqueous dispersion according to claim 1, wherein the aqueous dispersion has a total polymer content (A+B) of about 50 weight % or less.

5. An aqueous dispersion according to claim 1, wherein the aqueous dispersion has a total polymer content (A+B) of about 60 weight % or less.

6. An aqueous dispersion according to claim 1, wherein based on the total polymer content (A+B), the aqueous dispersion contains from about 40 weight % to about 95 weight % of the sulfopolyester (A) and from about 60 weight % to about 5 weight % of the addition polymer (B).

7. An aqueous dispersion according to claim 1, wherein based on the total polymer content (A+B), the aqueous dispersion contains from about 60 weight % to about 80 weight % of the sulfopolyester (A) and from about 40 weight % to about 20 weight % of the addition polymer (B).

8. An aqueous dispersion according to claim 1, wherein the first reaction mixture (A)(1) further comprises from about 0.1 mol. % to about 5 mol. % of a saturated aliphatic or a saturated alicyclic dicarboxylic acid, or ester thereof.

9. An aqueous dispersion according to claim 1, wherein the first reaction mixture (A)(1) contains from about 85 to about 90 mol. % terephthalic acid (A)(1)(a) and from about 10 to about 15 mol. % of the difunctional ester forming sulfomonomer (A)(1)(b).

10. An aqueous dispersion according to claim 1, wherein the second reaction mixture (A)(2) contains at least about 25 mol. % ethylene glycol.

11. An aqueous dispersion according to claim 1, wherein the second reaction mixture (A)(2) contains from about 40 mol. % to about 60 mol. % ethylene glycol.

12. An aqueous dispersion according to claim 1, wherein the sulfopolyester (A) has an inherent viscosity of at least about 0.20 dL/g measured at 250° C. in 60/40 parts by weight of a phenol/tetrachloroethane solvent at a concentration of 0.25 g/dL.

13. An aqueous dispersion, comprising:
  (A) a sulfopolyester formed as a polycondensation product of:
    (1) a first reaction mixture comprising:
      (a) at least about 70 mol. % of terephthalic acid or an ester thereof, and
      (b) about 4–20 mol. % of a difunctional ester forming sulfomonomer containing at least one metal sulfonate group attached to an aromatic nucleus and functional groups selected from the group consisting of hydroxyls, carboxyls and alkyl esters: and
    (2) a second reaction mixture comprising ethylene glycol, diethylene glycol and triethylene glycol, at least about 20 mol. % of the second reaction mixture being ethylene glycol; and
  (B) an addition polymer formed in situ on the sulfopolyester from polymerizing a plurality of monomers comprising at least about 50 weight % styrene monomer.

14. An aqueous dispersion according to claim 13, wherein the plurality of monomers comprises at least one carboxylic acid or ester thereof, the carboxylic acid being selected from the group consisting of acrylic acid, methacrylic acid, itaconic acid, maleic acid and fumaric acid.

15. An aqueous dispersion according to claim 13, wherein the addition polymer (B) is formed from polymerizing styrene monomer and from about 0.1 weight % to about 15 weight % of a carboxylic acid selected from the group consisting of acrylic acid, methacrylic acid, itaconic acid, maleic acid, fumaric acid and mixtures thereof.

16. An aqueous dispersion according to claim 13, wherein the addition polymer (B) is formed from polymerizing styrene monomer and from about 0.1 weight % to about 50 weight % of an ester of a carboxylic acid selected from the group consisting of acrylic acid, methacrylic acid, itaconic acid, fumaric acid, maleic acid and mixtures thereof.

17. The aqueous dispersion of claim 1 wherein the difunctional ester forming sulfomonomer (A)(1)(b) is 5-sodiosulfoisophthalic acid or an ester thereof.

18. The aqueous dispersion of claim 1 wherein the second reaction mixture (A)(2) comprises contains from about 0.1 mol. % to about 5 mol. % of a poly(ethylene glycol).

19. The aqueous dispersion of claim 1 wherein
the difunctional ester forming sulfomonomer (A)(1)(b) is 5-sodiosulfoisophthalic acid or an ester thereof,
the mol. ratio of terephthalic acid (A)(1)(a) to 5-sodiosulfoisophthalic acid (A)(1)(b) is approximately 85/15,
the addition polymer (B) is derived solely from styrene monomer, and
the weight ratio of sulfopolyester (A) to addition polymer (B) is approximately 70/30.

20. The aqueous dispersion of claim 13 wherein
the difunctional ester forming sulfomonomer (A)(1)(b) is 5-sodiosulfoisophthalic acid or an ester thereof, the mol. ratio of terephthalic acid (A)(1)(a) to 5-sodiosulfoisophthalic acid (A)(1)(b) is approximately 87/13,
the addition polymer (B) is formed from polymerizing styrene monomer and itaconic acid,
the weight ratio of styrene monomer to itaconic acid is approximately 99.5/0.5, and
the weight ratio of sulfopolyester (A) to addition polymer (B) is approximately 68/32.

21. A process of preparing an aqueous dispersion, comprising: forming a sulfopolyester by conducting polycondensation of:
(1) a first reaction mixture comprising:
(a) at least about 70 mol. % of terephthalic acid or an ester thereof, and
(b) about 4–20 mol. % of a difunctional ester forming sulfomonomer containing at least one metal sulfonate group attached to an aromatic nucleus and functional groups selected from the group consisting of hydroxyls, carboxyls and alkyl esters; and
(2) a second reaction mixture comprising at least two different glycols, at least about 20 mol. % of the second reaction mixture being ethylene glycol; and
conducting in situ polymerization of styrene monomer in the presence of the sulfopolyester.

22. A process of preparing an aqueous dispersion according to claim 21, further comprising adding a free radical initiator before conducting in situ polymerization of styrene monomer.

23. An aqueous dispersion, comprising:
(A) a sulfopolyester formed as a polycondensation product of:
(1) a first reaction mixture comprising:
(a) at least about 70 mol. % of terephthalic acid or an ester thereof, and
(b) about 4–20 mol. % of a difunctional ester forming sulfomonomer containing at least one metal sulfonate group attached to an aromatic nucleus and functional groups selected from the group consisting of hydroxyls, carboxyls and alkyl esters; and
(2) a second reaction mixture comprising at least two different glycols, at least about 20 mol. % of the second reaction mixture being ethylene glycol and from about 0.1 mol. % to about 5 mol. % being a poly(tetramethylene glycol); and
(B) an addition polymer formed in situ on the sulfopolyester from polymerizing styrene monomer.

24. An aqueous dispersion, comprising:
(A) a sulfopolyester formed as a polycondensation product of:
(1) a first reaction mixture comprising:
(a) at least about 70 mol. % of terephthalic acid or an ester thereof, and
(b) about 4–20 mol. % of a difunctional ester forming sulfomonomer containing at least one metal sulfonate group attached to an aromatic nucleus and functional groups selected from the group consisting of hydroxyls, carboxyls and alkyl esters; and
(2) a second reaction mixture comprising at least two different glycols, at least about 20 mol. % of the second reaction mixture being ethylene glycol and from about 0.1 mol. % to about 5 mol. % being a poly(tetramethylene glycol); and
(B) an addition polymer formed in situ on the sulfopolyester from polymerizing a plurality of monomers comprising at least about 50 weight % styrene monomer.

* * * * *